3,655,577
PHOSPHORS
Tsuyoshi Kano, Higashi-Murayama, Yoshiro Otomo, Mitaka, and Hajime Yamamoto, Kokubunji, Japan, assignors to Hitachi, Ltd., Tokyo, Japan
Filed June 24, 1970, Ser. No. 49,250
Claims priority, application Japan, June 30, 1969, 44/51,607
Int. Cl. C09k 1/14
U.S. Cl. 252—301.4 S                         5 Claims

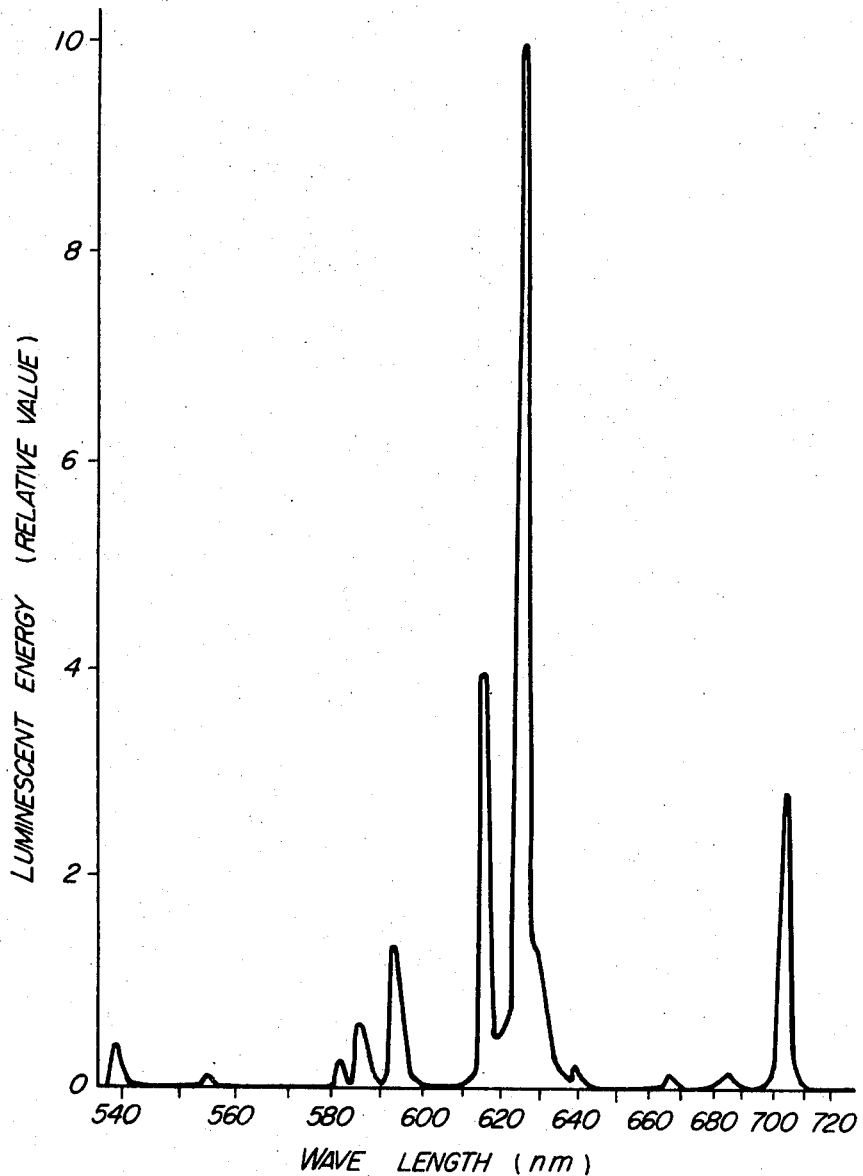

ABSTRACT OF THE DISCLOSURE

An oxy-sulfide phosphor having extremely improved luminescent intensity which comprises europium as an activator; praseodymium or a mixture thereof with terbium as a sensitizer; and a base having a composition capable of making the sensitizing actions of said elements particularly marked.

---

The present invention relates to a phosphor which comprises europium as an activator, praseodymium or a mixture thereof with terbium as a sensitizer, and a base composed of oxy-sulfides of yttrium and gadolinium.

As is well known, a phosphor comprising europium as an activator and, as a base, an oxysulfide of at least one element selected from the group consisting of yttrium, gadolinium and lanthanum is an excellent red luminescent phosphor for color television and has come to be used widely.

The present inventors previously knew, and disclosed in U.S. application Ser. No. 840,931, the fact that for the improvement in brightness of such oxy-sulfide phosphor as mentioned above, it is effective to make present in the phosphor a slight amount of at least one element selected from terbium and praeodymium. More particularly, the inventors found that a very small amount of praseodymium or praseodymium and terbium will effectively increase the brightness of the oxy-sulfide phosphor using europium as an activator.

As the result of further studies on the improvement in brightness of said oxy-sulfide phosphor, the inventors have found a base composition which can make the sensitizing action of said minor element particularly marked.

An object of the present invention is to provide a phosphor having extremely improved luminescent intensity which comprises europium as an activator, praseodymium or a mixture thereof with terbium as a sensitizer, and a base composed of oxy-sulfides of yttrium and gadolinium.

Other objects and effects of the invention will become apparent from the following description.

The phosphor according to the present invention has a structure capable of being represented by the general formula,

$(1-w-x-y-z) Y_2O_2S.wGd_2O_2S.xEu_2O_2S.yPr_2O_2S.zTb_2O_2S$ wherein $0.02 \leq w \leq 0.4$, $0.03 \leq x \leq 0.05$, $2 \times 10^{-6} \leq y \leq 1 \times 10^{-4}$ and $0 \leq z \leq 4 \times 10^{-5}$.

Figure 1:
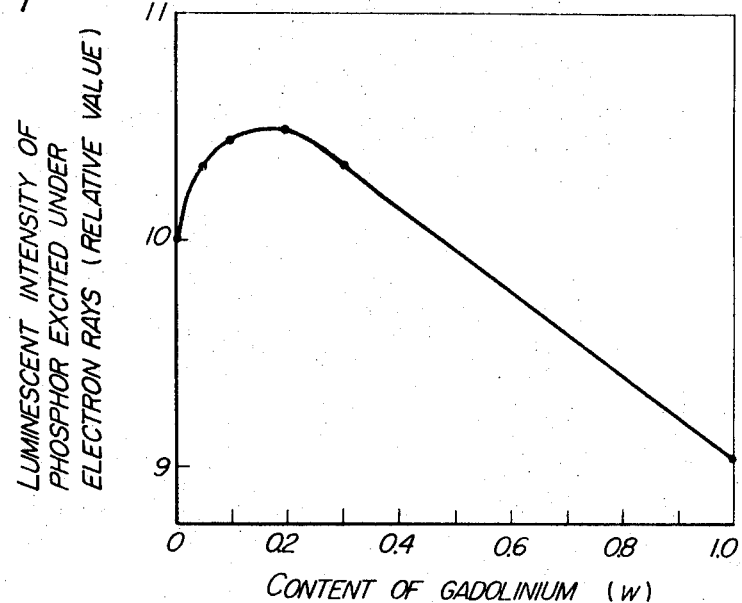

In the accompanying drawings, FIG. 1 is a diagram of characteristic curve of an example of the present phosphors which shows the relation between the content of gadolinium and the luminescent intensity; FIG. 2 is a diagram of emission spectrum characteristic curve of the present phosphor; and FIG. 3 is a diagram of characteristic curves showing the relation between the content of praseodymium and the luminescent intensity.

In FIG. 1, there is shown the relation between the gadolinium content ($w$) and the luminescent intensity in the case of a phosphor represented by the aforesaid general formula, in which $x=0.043$, $y=7 \times 10^{-6}$, and $z=0$. In the drawing, the vertical axis shows the luminescent intensity (relative value) in the case where the said phosphor was excited under an electron ray to emit the fluorescence, while the horizontal axis shows the amount of gadolinium contained in the phosphor (the amount is represented by $w$ in the aforesaid formula). As is clear from FIG. 1, the luminescent intensity of phosphor is closely related to the gadolinium content of the base, and a bright phosphor is obtained in the case where $0.02 \leq w \leq 0.4$, more preferably $0.02 \leq w \leq 0.3$ and most preferably $0.1 \leq w \leq 0.2$.

FIG. 2 shows the emission spectrum characteristic curve of a phosphor represented by the aforesaid formula, in which $w=0.1$, $x=0.043$ and $z=7 \times 10^{-6}$. Within such low concentration ranges as adopted in the present invention, the values of $y$ and $z$ in the said formula have no particular influence on the emission spectrum. As the value of $w$ increases, however, each emission peak wave length moves to the short wave length side. However, the extent of said movement is so slight that no substantial problem is brought about in the range of $0.02 \leq w \leq 0.4$, which is adopted in the present invention. Further, as the value of $w$ increases, the emission at the short wave length side becomes relatively stronger and the color tone is somewhat transferred to an orange color. In case the value of $w$ is large, therefore, the influence thereof should be taken into consideration.

Figure 3:
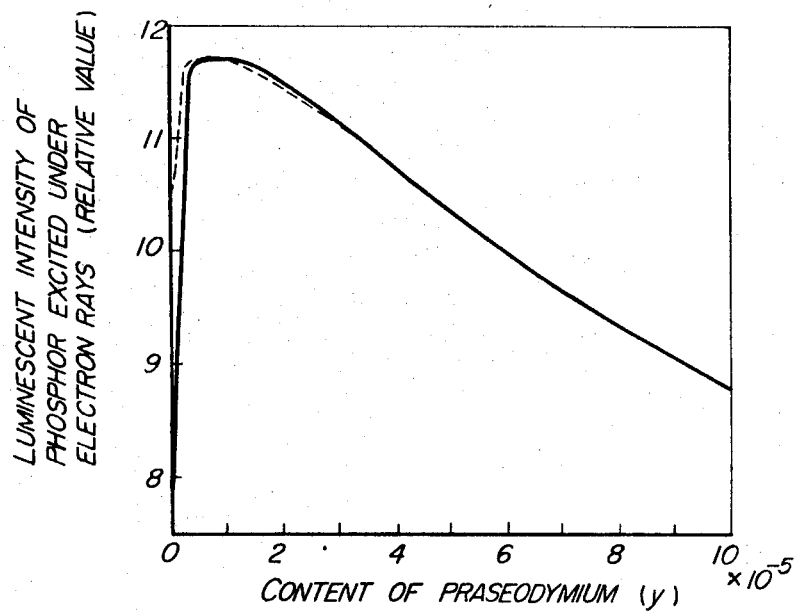

FIG. 3 is a diagram of characteristic curves showing the relation between the praseodymium content ($y$) of the present phosphor and the luminescent intensity of the phosphor, in which the solid line shows the case where, in the aforesaid formula, $w=0.2$, $x=0.043$ and $z=0$, while the broken line shows the case where $w=0.2$, $x=0.043$ and $z=2 \times 10^{-6}$.

As will be understood from FIG. 3, praseodymium increases the luminescent intensity when used in an amount within the range of $2 \times 10^{-6} \leq y \leq 10^{-4}$, and display a sensitizing effect of more than 40% when used in an amount within the range of $3 \times 10^{-6} \leq y \leq 25 \times 10^{-6}$. When a slight amount of terbium (Tb) is made present, praseodymium comes to give the maximum intensity with a lower concentration, as shown in the drawing. However, if the concentration ($z$) of the co-existing terbium exceeds $4 \times 10^{-5}$, the said effect is greatly decreased.

The above-mentioned phosphor of the present invention can be produced according to an ordinary process. For example, oxides of yttrium, gadolinium, europium, praseodymium and, if necessary, tertium, or compounds thereof capable of being converted to oxides on firing, e.g. oxalates or the like, are homogeneously mixed together in the presence of sulfur, and the resulting mixture is fired, whereby the phosphor of the present invention can be obtained. In this case, the addition of a suitable flux such as, for example, sodium carbonate, potassium arsenate, potassium phosphate or lithium sulfate is effective for further improving the brightness of the phosphor.

The praseodymium and terbium, which are part of the starting material, are used in extremely small amounts as compared with other components, and therefore the amounts thereof should be controlled with much care. For example, a process, in which is used as the starting material an oxide obtained by dissolving the individual rare earth oxides in nitric acid, mixing the resulting aqueous nitrate solutions to a given ratio, adding an aqueous oxalic acid solution to the resulting mixed solution to coprecipitate oxalates of the individual rare earth elements and then thermally decomposing the thus formed precipitate, is excellent in that the minor constituents can be uniformly incorporated into the phosphor.

Further, such minor constituents as praseodymium and terbium may be dissolved in, for example, nitric acid or the like, and then incorporated into the yttrium oxide and the like constituents.

The present invention is illustrated in further detail below with reference to examples.

In view of the points that a slight amount of terbium as impurity is contained in a common yttrium oxide and that the content of terbium should be strictly controlled in the case of the present phosphor, there was used in each of the examples yttrium oxide containing less than 1 p.p.m. of terbium.

Example 1

A mixture comprising 1.760 g. of europium oxide, 7.250 g. of gadolinium oxide and 16.938 g. of yttrium oxide was dissolved in 50 ml. of concentrated nitric acid (specific gravity 1.38), and the resulting nitrate solution was diluted with 115 ml. of pure water. Subsequently, praseodymium oxide was dissolved in nitric acid to prepare an aqueous praseodymium nitrate solution containing 28.18 mg. of praseodymium per liter of the solution. 7 ml. of the thus prepared solution was added to the above-mentioned nitric acid solution containing yttrium and europium, and the resulting mixed solution was heated to 60° C. On the other hand, a solution of 46 g. of oxalic acid dihydrate in 100 ml. of water was heated to 60° C. and then added with stirring to the above-mentioned solution containing yttrium and the like to coprecipitate oxalates of yttrium, europium and praseodymium. The precipitate-containing solution was allowed to cool and then washed 4 times with pure water by decantation, and the precipitate was suction-filtered. This precipitate was dried at 150° C. for 10 hours and then heated at 800° C. for 3 hours to obtain an oxide. 23 g. of the thus obtained oxide was thoroughly mixed with 6 g. of sulfur and 7 g. of sodium carbonate, and the resulting mixture was fired in a tightly closed crucible at 1,100° C. for 3 hours. Thereafter, the fired mixture was ball-milled together with water, thoroughly washed with water and then dried at 150° C. to obtain a phosphor.

The thus obtained phosphor could be represented by the formula, $$0.75\ Y_2O_2S.\ 0.20\ Gd_2O_2S.\ 0.05\ Eu_2O_2S.\ 7\times10^{-6}\ Pr_2O_2S$$

and when the intensity of said phosphor was determined under the electron ray excitation, it was observed that the intensity was 5% increased, as compared with that of the phosphor containing no gadolinium.

Example 2

A mixture comprising 1.514 g. of europium oxide, 3.625 g. of gadolinum oxide and 19.355 g. of yttrium oxide was dissolved in 50 ml. of concentrated nitric acid (specific gravity 1.38) and the resulting nitrate solution was diluted with 115 ml. of pure water. Subsequently, the same operations as in Example 1 were effected to obtain a phosphor capable of being represented by the formula, $$0.857\ Y_2O_2S.\ 0.10\ Gd_2O_2S.\ 0.043\ Eu_2O_2S.\ 7\times10^{-6}\ Pr_2O_2S.$$

When the intensity of the thus obtained phosphor was determined under electron ray excitation, it was observed that the intensity was 4% increased, as compared with that of the phosphor prepared in the same manner as above, but containing no gadolinium.

Example 3

A mixture comprising 1.514 g. of europium oxide, 3.625 g. of gadolinium oxide and 19.355 g. of yttrium oxide was dissolved in 50 ml. of concentrated nitric acid (specific gravity 1.38) and the resulting nitrate solution was diluted with 115 ml. of pure water. Subsequently, praseodymium oxide and terbium oxide were individually dissolved in nitric acid to prepare an aqueous praseodymium nitrate solution containing 28.18 mg. of praseodymium per liter of the solution and an aqueous terbium nitrate solution containing 31.79 mg. of terbium per liter of the solution. 5 ml. of the aqueous praseodymium solution and 7 ml. of the aqueous terbium nitrate solution were added to the aforesaid solution containing yttrium oxide and the like, and the mixed solution was heated to 60° C. Subsequently, the same operations as in Example 1 were effected to obtain a phosphor capable of being represented by the formula, $$0.857\ Y_2O_2S.\ 0.10\ Gd_2O_2S.\ 0.043\ Eu_2O_2S.$$
$$5\times10^{-6}\ Pr_2O_2S.\ 7\times10^{-6}\ Tb_2O_2S$$

When the intensity of the thus obtained phosphor was determined under electron ray excitation it was observed that the intensity was 5% increased, as compared with that of the phosphor prepared in the same manner as above, but containing no gadolinium.

Example 4

A mixture comprising 1.760 g. of europium oxide, 1.813 g. of gadolinium oxide and 20.484 g. of yttrium oxide was dissolved in 50 ml. of concentrated nitric acid (specific gravity 1.38) and the resulting nitrate solution was diluted with 115 ml. of pure water. Subsequently, praseodymium oxide and terbium oxide were individually dissolved in nitric acid to prepare an aqueous praseodymium nitrate solution containing 28.18 mg. of praseodymium per liter of the solution and an aqueous terbium nitrate solution containing 31.79 mg. of terbium per liter of the solution. 5 ml. of the aqueous praseodymium nitrate solution and 7 ml. of the aqueous terbium nitrate solution were added to the aforesaid solution containing yttrium oxide and the like, and the mixed solution was heated to 60° C. Subsequently, the same operations as in Example 1 were effected to obtain a phosphor capable of being represented by the formula, $$0.907\ Y_2O_2S.\ 0.05\ Gd_2O_2S.\ 0.043\ Eu_2O_2S.$$
$$5\times10^{-6}\ Pr_2O_2S.\ 7\times10^{-6}\ Tb_2O_2S$$

When the intensity of the thus obtained phosphor was determined under electron ray excitation, it was observed that the intensity was 3.5% increased, as compared with that of the phosphor prepared in the same manner as above, but containing no gadolinium.

What is claimed is:

1. A phosphor having a composition represented by the general formula, $$(1-w-x-y-z)\ Y_2O_2S,\ wGd_2O_2S.\ xEu_2O_2S.\ yPr_2O_2S.\ zTb_2O_2S$$

wherein $0.02\leq w\leq 0.4$, $0.03\leq x 0.05$, $2\times10^{-6}\leq y\leq 1\times10^{-4}$, and $0\leq z\leq 4\times10^{-5}$.

2. A phosphor according to claim 1, wherein $w$ in said general formula is in the range of $0.02\leq w\leq 0.3$ 3. A phosphor according to claim 1, wherein $w$ in said general formula is in the range of $0.1\leq w\leq 0.2$.

4. A phosphor according to claim 1, wherein $y$ in said general formula is in the range of $3\times10^{-6}\leq y\leq 25\times10^{-6}$.

5. A phosphor according to claim 1, wherein $w$ in said general formula is in the range of $0.02\leq w\leq 0.3$ and $y$ in said general formula is in the range of $$3\times10^{-6}\leq y\leq 25\times10^{-6}.$$

References Cited

UNITED STATES PATENTS 3,322,682, 5/1967 Thompson _____ 252—301.4 R
3,418,246 12/1968 Royce _____ 252—301.4 S ROBERT D. EDMONDS, Primary Examiner